(12) United States Patent
Morishita

(10) Patent No.: US 11,686,382 B2
(45) Date of Patent: Jun. 27, 2023

(54) DRIVE TRANSMISSION DEVICE CAPABLE OF PREVENTING TRANSMISSION OF DRIVING NOISE TO OUTSIDE, IMAGE FORMING APPARATUS

(71) Applicant: KYOCERA Document Solutions Inc., Osaka (JP)

(72) Inventor: Hiroki Morishita, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 17/654,794

(22) Filed: Mar. 14, 2022

(65) Prior Publication Data

US 2022/0299101 A1 Sep. 22, 2022

(30) Foreign Application Priority Data

Mar. 18, 2021 (JP) ................................. 2021-044945

(51) Int. Cl.
*F16H 57/02* (2012.01)
*G03G 15/00* (2006.01)
*F16H 57/021* (2012.01)
*F16H 57/031* (2012.01)
*G03G 21/16* (2006.01)
*F16H 57/032* (2012.01)

(52) U.S. Cl.
CPC ......... *F16H 57/021* (2013.01); *F16H 57/031* (2013.01); *G03G 15/757* (2013.01); *F16H 57/032* (2013.01); *F16H 2057/0216* (2013.01); *G03G 21/1695* (2013.01); *G03G 2221/1657* (2013.01)

(58) Field of Classification Search
CPC .... F16H 57/021; F16H 57/031; F16H 57/032; F16H 2057/02069; F16H 2057/0216; F16H 2057/0325; G03G 15/1615; G03G 15/757; G03G 21/1695; G03G 2221/1657
See application file for complete search history.

(56) References Cited

U.S. PATENT DOCUMENTS

| | | | | |
|---|---|---|---|---|
| 3,802,289 | A * | 4/1974 | Cheek | F16H 57/021 74/606 R |
| 7,672,624 | B2 * | 3/2010 | Dawson | G03G 15/0875 399/262 |
| 7,829,006 | B2 * | 11/2010 | Aisenbrey | H01Q 9/16 264/328.6 |
| 9,126,666 | B2 * | 9/2015 | Davis | F16H 57/031 |
| 9,835,242 | B2 * | 12/2017 | Itoo | F16D 11/14 |

(Continued)

FOREIGN PATENT DOCUMENTS

JP 2017031991 A 2/2017

*Primary Examiner* — Adam D Rogers
(74) *Attorney, Agent, or Firm* — Alleman Hall Creasman & Tuttle LLP

(57) ABSTRACT

A drive transmission device includes an intermediate gear, a housing portion, and a support portion. The intermediate gear meshes with a first gear and a second gear to transmit a rotational driving force from the first gear to the second gear. The housing portion is formed from resin and includes a pair of cover portions, covering both sides of a gear train including the intermediate gear, to house the gear train. The support portion is formed from metal and supports the rotation shaft of the intermediate gear at a position outside the housing portion.

6 Claims, 9 Drawing Sheets

(56) References Cited

U.S. PATENT DOCUMENTS

| | | | |
|---|---|---|---|
| 10,101,688 B2* | 10/2018 | Maeshima | G03G 21/1647 |
| 10,794,453 B2* | 10/2020 | Weir | F16H 57/023 |
| 2017/0031303 A1 | 2/2017 | Tamura | |
| 2022/0342356 A1* | 10/2022 | Kurosu | G03G 15/757 |

* cited by examiner

DRIVE TRANSMISSION DEVICE CAPABLE OF PREVENTING TRANSMISSION OF DRIVING NOISE TO OUTSIDE, IMAGE FORMING APPARATUS

INCORPORATION BY REFERENCE

This application is based upon and claims the benefit of priority from the corresponding Japanese Patent Application No. 2021-044945 filed on Mar. 18, 2021, the entire contents of which are incorporated herein by reference.

BACKGROUND

The present disclosure relates to a drive transmission device and an image forming apparatus.

An image forming apparatus includes a drive transmission device that transmits a driving force generated by a motor to components inside the apparatus. For example, a related-art drive transmission device includes a gear train, a metal support portion that supports the rotation shafts of gears included in the gear train on one side of the gear train, and a resin cover portion that faces the support portion with the gear train therebetween to form a storage space for the gear train between the cover portion and the support portion.

SUMMARY

A drive transmission device according to an aspect of the present disclosure includes an intermediate gear, a housing portion, and a support portion. The intermediate gear meshes with a first gear and a second gear to transmit a rotational driving force from the first gear to the second gear. The housing portion is formed from resin and includes a pair of cover portions, covering both sides of a gear train including the intermediate gear, to house the gear train. The support portion is formed from metal and supports the rotation shaft of the intermediate gear at a position outside the housing portion.

An image forming apparatus according to another aspect of the present disclosure includes a driving source, a load, and the drive transmission device. The load is driven by a driving force supplied by the driving source. The drive transmission device is used to transmit the driving force from the driving source to the load.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings. It should be noted that the following embodiment is an example of a specific embodiment of the present disclosure and should not limit the technical scope of the present disclosure.

[Configuration of Image Forming Apparatus 200]

First, the configuration of an image forming apparatus 200 according to the embodiment of the present disclosure will be described with reference to FIG. 1. Here, FIG. 1 is a cross-sectional view showing the configuration of the image forming apparatus 200.

For purposes of illustration, the vertical direction in a state where the image forming apparatus 200 is installed and ready for use (state shown in FIG. 1) is defined as an up-down direction D1. In addition, a front-rear direction D2 is defined on the premise that the face of the image forming apparatus 200 on the left side of the page in FIG. 1 serves as the front (front face). In addition, a left-right direction D3 is defined relative to the front of the image forming apparatus 200 in the installed state.

The image forming apparatus 200 is a printer that forms images by an electrophotographic method. It is noted that the image forming apparatus of the present disclosure may be a facsimile apparatus, a copier, or a multifunction peripheral.

Figure 1:
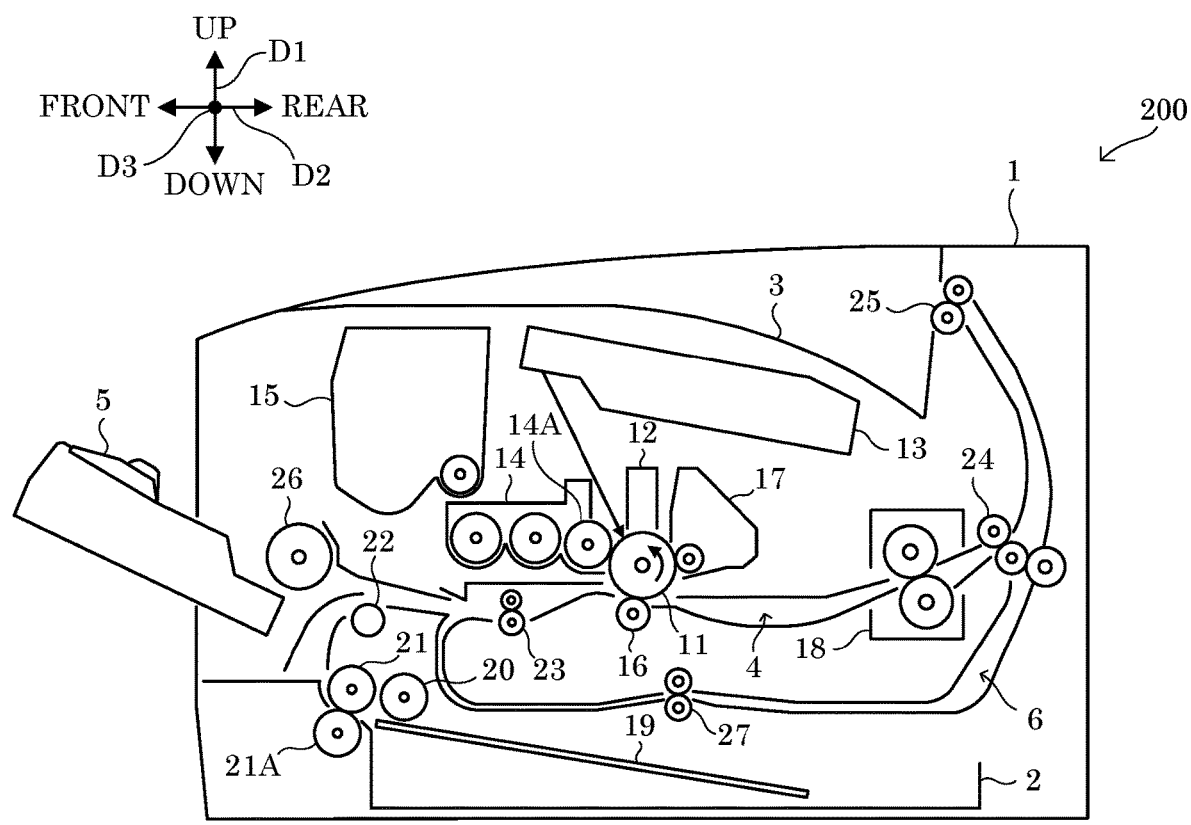
FIG. 1 is a diagram showing a configuration of an image forming apparatus according to an embodiment of the present disclosure.

As shown in FIG. 1, the image forming apparatus 200 includes a housing 1. The housing 1 holds components of the image forming apparatus 200. The housing 1 is a substantially rectangular parallelepiped.

As shown in FIG. 1, the housing 1 is provided with a sheet storing portion 2 that houses sheets on which images are to be formed in a lower part of the housing 1. The housing 1 is also provided with a sheet discharge portion 3 to which sheets with images formed thereon are discharged in an upper part of the housing 1. A first conveyance path 4 extending from the sheet storing portion 2 to the sheet discharge portion 3 is formed inside the housing 1. The sheets housed in the sheet storing portion 2 are conveyed to the sheet discharge portion 3 through the first conveyance path 4.

As shown in FIG. 1, the housing 1 is provided with a manual feed tray 5 used to feed sheets in the front of the housing 1. In addition, a second conveyance path 6 used for duplex printing is formed inside the housing 1.

As shown in FIG. 1, the housing 1 is provided with a photoconductor drum 11, a charging device 12, a laser scanning unit 13, a developing device 14, a toner container 15, a transfer roller 16, a cleaning device 17 and a fixing device 18 inside the housing 1.

The photoconductor drum 11 is an object on which electrostatic latent images are to be formed. The charging device 12 electrically charges the surface of the photoconductor drum 11. The laser scanning unit 13 emits a light beam based on image data onto the surface of the charged photoconductor drum 11 to form an electrostatic latent image corresponding to the image data on the surface.

The developing device 14 develops the electrostatic latent image formed on the surface of the photoconductor drum 11 using toner. As shown in FIG. 1, the developing device 14 includes a developing roller 14A that carries toner stored inside the developing device 14 to an area facing the photoconductor drum 11. The toner container 15 supplies the toner for the developing device 14.

The transfer roller 16 transfers a toner image on the photoconductor drum 11 developed by the developing device 14 to a sheet conveyed by a registration roller 23 (see FIG. 1). The cleaning device 17 cleans the surface of the photoconductor drum 11 after the toner image is transferred by the transfer roller 16. The fixing device 18 fixes the toner image formed on the sheet by the transfer roller 16 to the sheet.

In addition, as shown in FIG. 1, the housing 1 includes a lift plate 19, a pickup roller 20, a first sheet feed roller 21, a first conveying roller 22, the registration roller 23, a second conveying roller 24, a sheet discharge roller 25, a second sheet feed roller 26, and a duplex roller 27.

The lift plate 19 is pivotably disposed at the bottom of the sheet storing portion 2 and configured to push up a sheet stack housed in the sheet storing portion 2 to a contact position with the pickup roller 20. The pickup roller 20 comes into contact with the uppermost sheet in the sheet stack pushed up by the lift plate 19 and conveys the sheet to the first sheet feed roller 21. The first sheet feed roller 21 forms a nip portion between itself and a separation roller 21A (see FIG. 1) and conveys only one sheet of one or more sheets conveyed to the nip portion by the pickup roller 20 to the first conveying roller 22. The first conveying roller 22 conveys the sheet conveyed by the first sheet feed roller 21 to the registration roller 23.

The registration roller 23 conveys the sheet to a position where the photoconductor drum 11 and the transfer roller 16 face each other at a predetermined timing. The second conveying roller 24 conveys the sheet that has passed through the fixing device 18 to the sheet discharge roller 25. The sheet discharge roller 25 discharges the sheet to the sheet discharge portion 3. The sheet discharge roller 25 is also used to pull back the sheet with an image formed on the surface thereof. The sheet pulled back by the sheet discharge roller 25 is conveyed to the second conveyance path 6 by the second conveying roller 24.

The second sheet feed roller 26 conveys a sheet placed on the manual feed tray 5 to the upstream side of the registration roller 23 along the first conveyance path 4. The duplex roller 27 conveys the sheet conveyed to the second conveyance path 6 by the second conveying roller 24 to the upstream side of the registration roller 23 along the first conveyance path 4.

Figure 2:
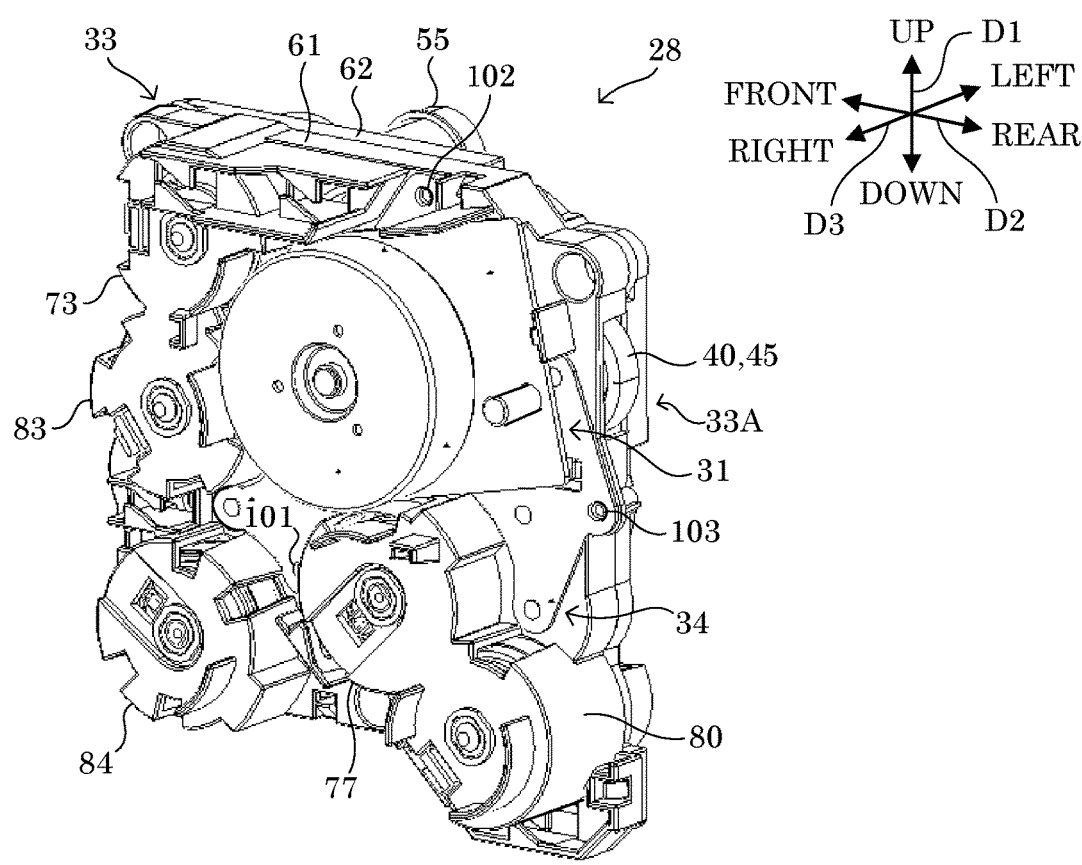
FIG. 2 is a diagram showing a configuration of a driving force supply portion according to the embodiment of the present disclosure.

The developing roller 14A, the first sheet feed roller 21, the first conveying roller 22, the registration roller 23, the second sheet feed roller 26, and the duplex roller 27 rotate under a driving force supplied by a driving force supply portion 28 (see FIG. 2). The driving force supply portion 28 is disposed inside a right outer wall of the housing 1. The developing roller 14A, the first sheet feed roller 21, the first conveying roller 22, the registration roller 23, the second sheet feed roller 26, and the duplex roller 27 are examples of a load of the present disclosure.

[Configuration of Driving Force Supply Portion 28]

Figure 3:
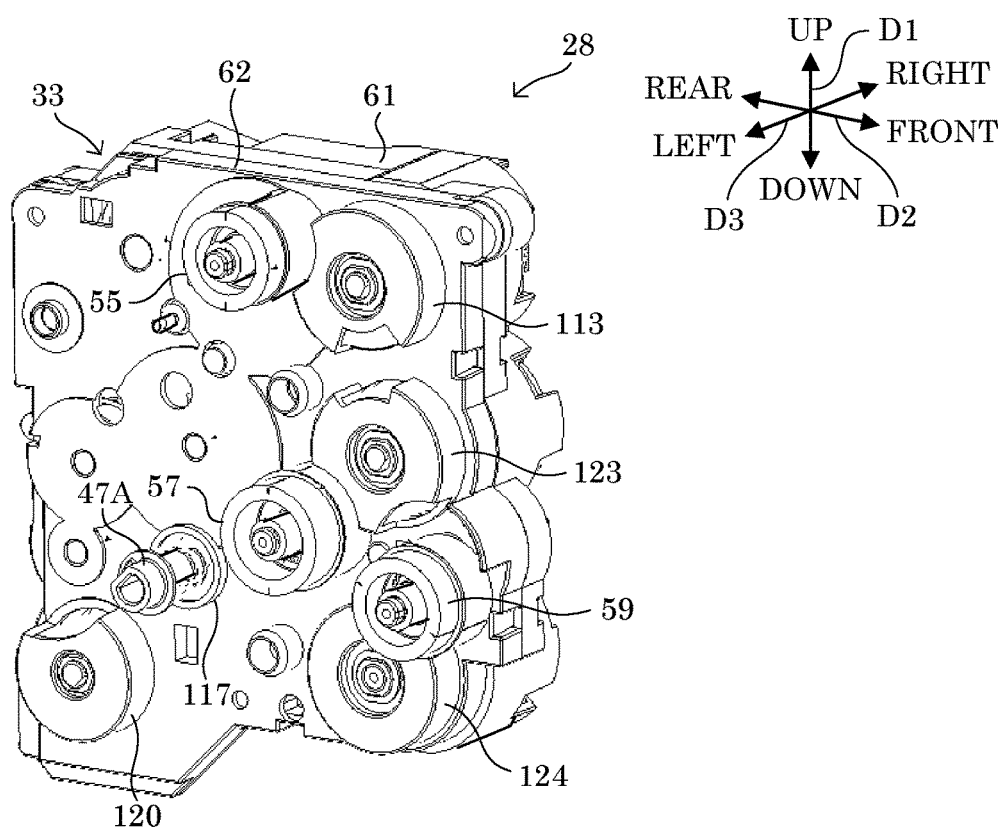
FIG. 3 is a diagram showing the configuration of the driving force supply portion according to the embodiment of the present disclosure.
Figure 4:
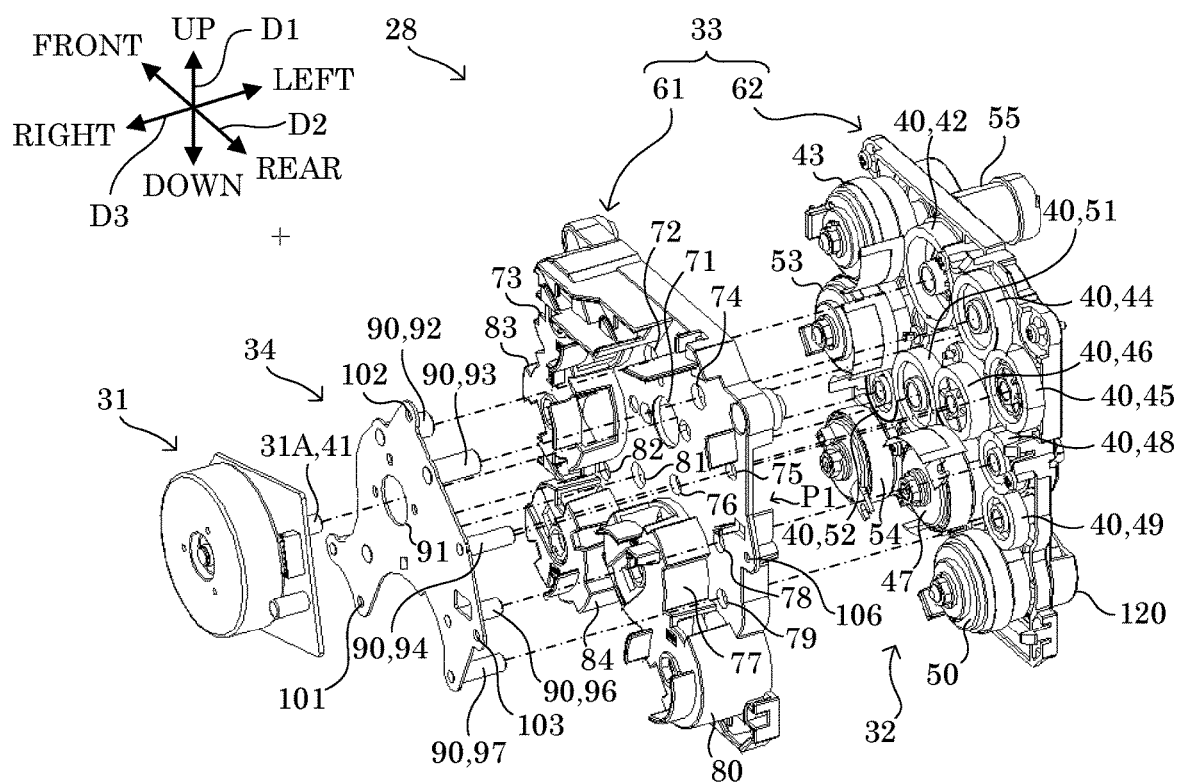
FIG. 4 is a diagram showing the configuration of the driving force supply portion according to the embodiment of the present disclosure.
Figure 5:
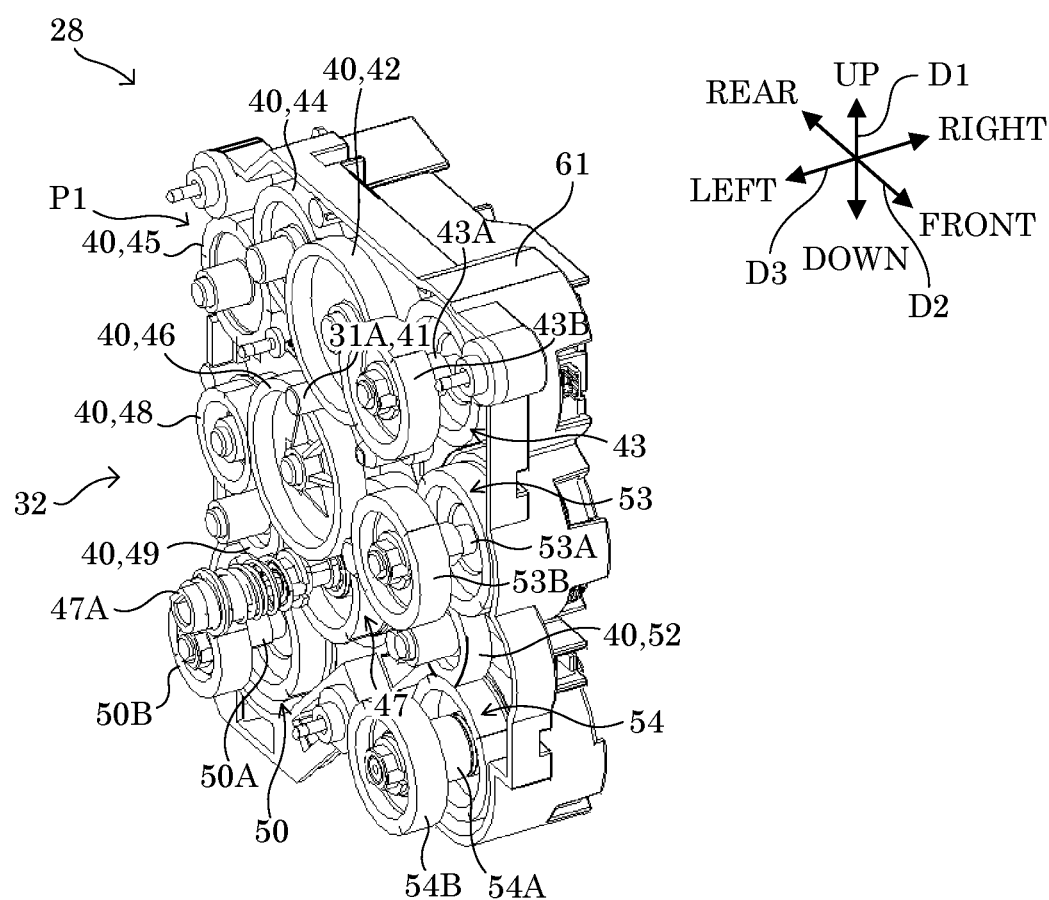
FIG. 5 is a diagram showing the configuration of the driving force supply portion according to the embodiment of the present disclosure.
Figure 6:
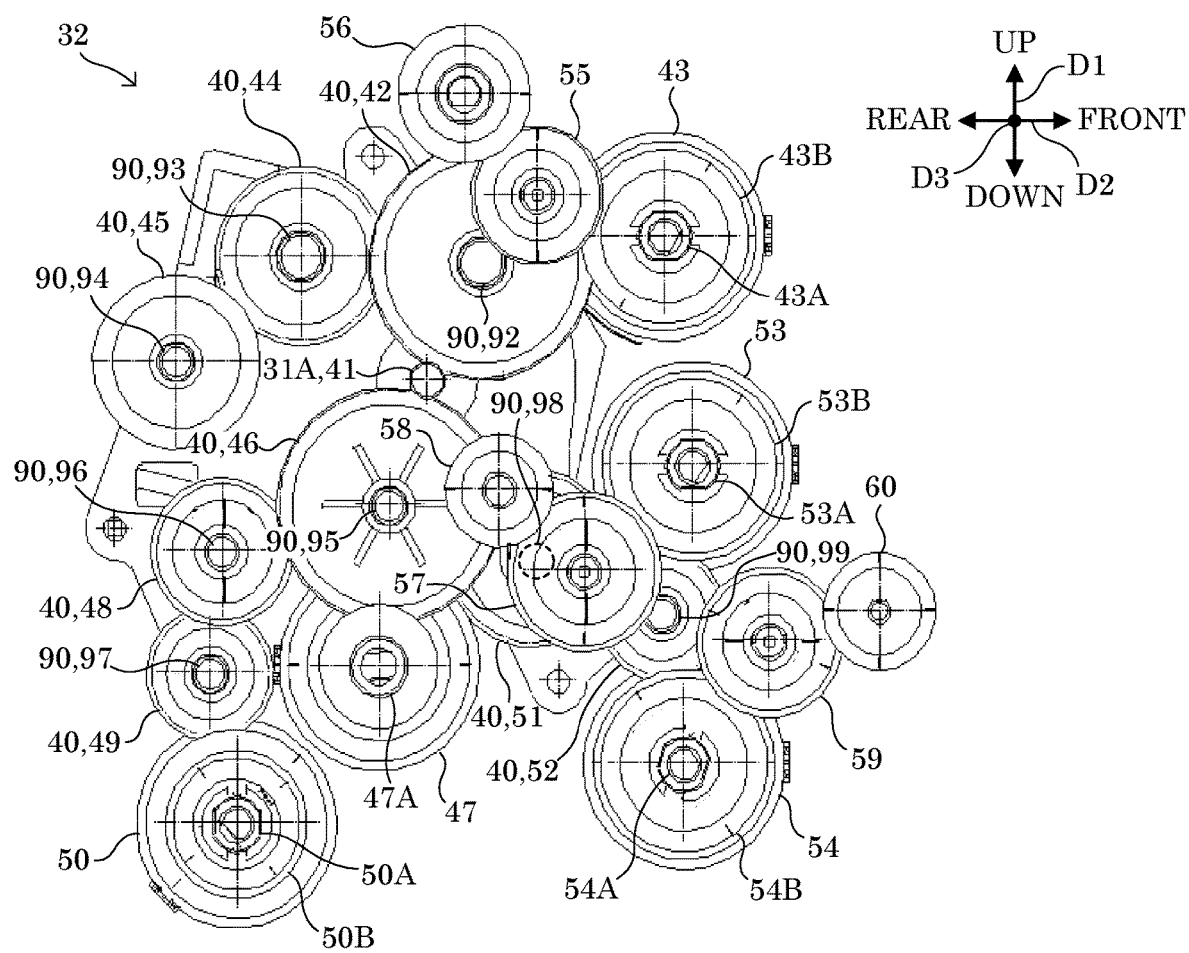
FIG. 6 is a diagram showing a configuration of a gear train of the driving force supply portion according to the embodiment of the present disclosure.
Figure 7:
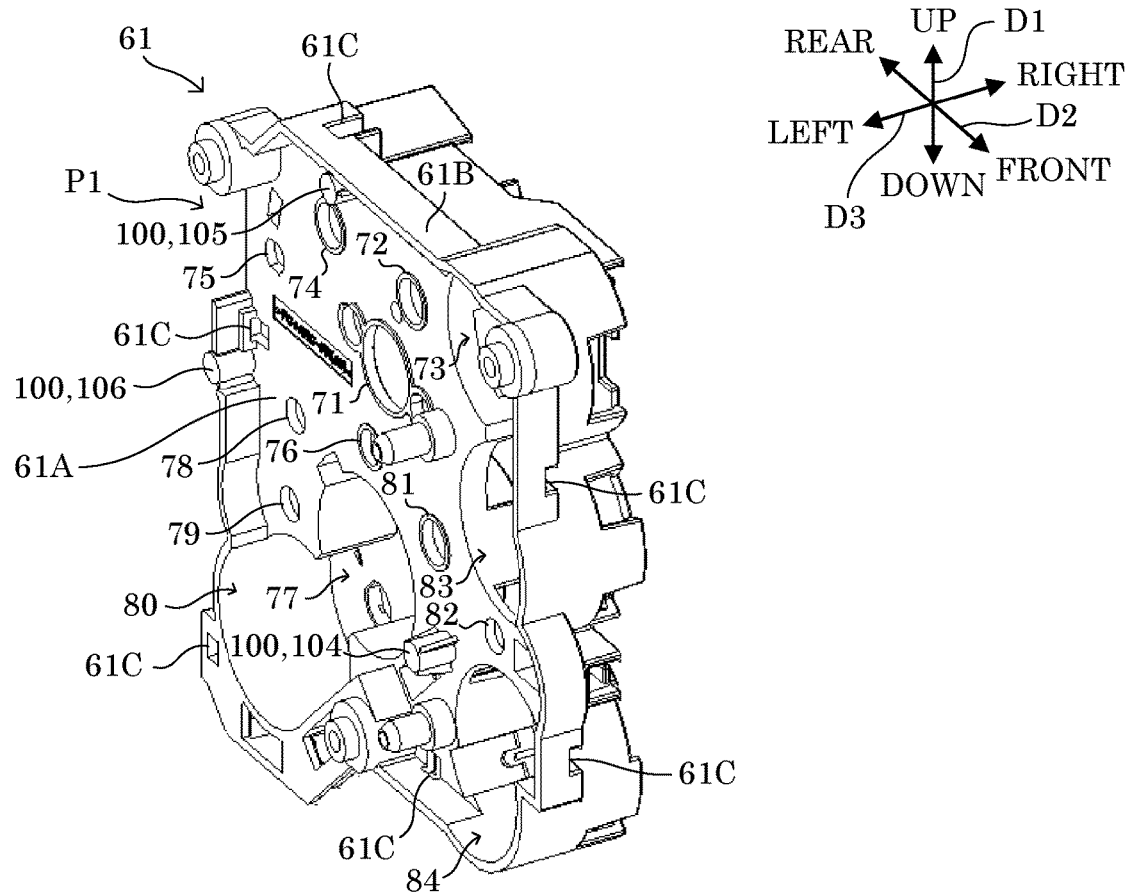
FIG. 7 is a diagram showing a configuration of a first cover portion of the driving force supply portion according to the embodiment of the present disclosure.
Figure 8:
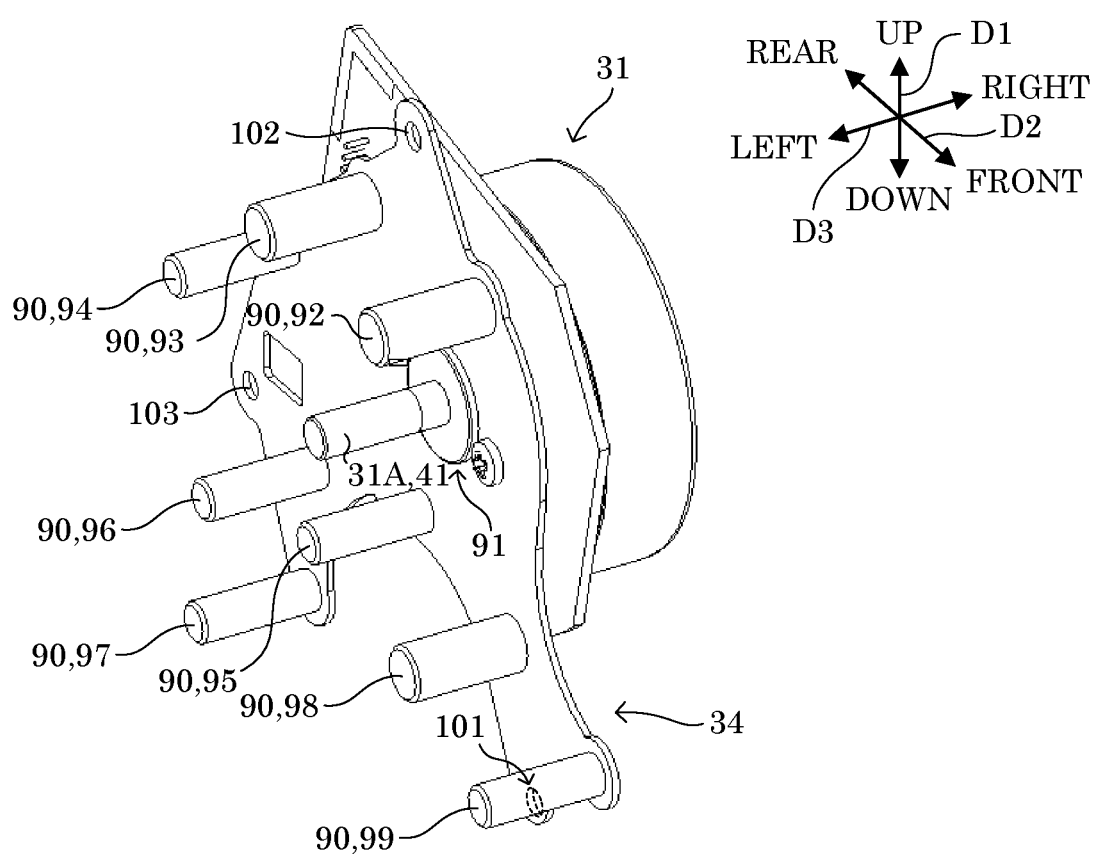
FIG. 8 is a diagram showing a configuration of a support portion of the driving force supply portion according to the embodiment of the present disclosure.
Figure 9:
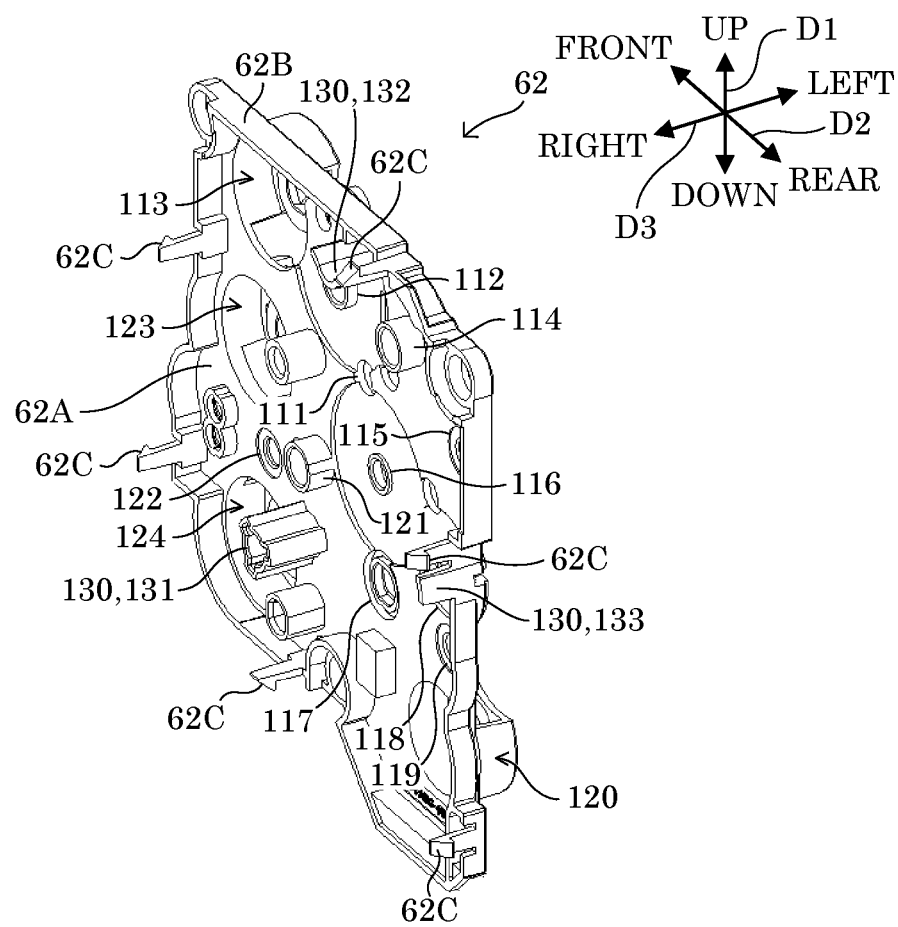
FIG. 9 is a diagram showing a configuration of a second cover portion of the driving force supply portion according to the embodiment of the present disclosure.

The following describes the configuration of the driving force supply portion 28 with reference to FIGS. 2 to 9. Here, FIG. 2 is a perspective view showing the configuration of the right face of the driving force supply portion 28. FIG. 3 is a perspective view showing the configuration of the left face of the driving force supply portion 28. FIG. 4 is an exploded view showing the components of the driving force supply portion 28. FIG. 5 is a perspective view of the driving force supply portion 28 without a second cover portion 62 shown in FIG. 3. FIG. 6 is a left side view showing the configuration of a gear train 32. FIG. 7 is a perspective view showing the configuration of the left face of a first cover portion 61. FIG. 8 is a perspective view showing the configuration of the left face of a support portion 34 to which a drive motor 31 is attached. FIG. 9 is a perspective view showing the configuration of the right face of the second cover portion 62. It is noted that the positional relationships between the components of the driving force supply portion 28 are indicated by alternate long and short dash lines in FIG. 4.

As shown in FIG. 4, the driving force supply portion 28 includes the drive motor 31, the gear train 32, a housing portion 33, and the support portion 34. The driving force supply portion 28 is an example of a drive transmission device of the present disclosure.

The drive motor 31 creates a driving force to drive loads such as the developing roller 14A. For example, the drive motor 31 is a stepping motor. The drive motor 31 is an example of a driving source of the present disclosure.

The gear train 32 transmits the driving force created by the drive motor 31. As shown in FIG. 6, the gear train 32 includes a drive gear 41, a first intermediate gear 42, a first clutch 43, a second intermediate gear 44, a third intermediate gear 45, a fourth intermediate gear 46, a second clutch 47, a fifth intermediate gear 48, a sixth intermediate gear 49, a third clutch 50, a seventh intermediate gear 51, an eighth intermediate gear 52, a fourth clutch 53, and a fifth clutch 54. The gear train 32 is housed in the housing portion 33.

In the description below, the first intermediate gear 42, the second intermediate gear 44, the third intermediate gear 45, fourth intermediate gear 46, the fifth intermediate gear 48, the sixth intermediate gear 49, the seventh intermediate gear 51, and the eighth intermediate gear 52 are also collectively referred to as "intermediate gears 40".

The drive gear 41 is mounted on the drive shaft 31A of the drive motor 31.

The intermediate gears 40 mesh with a plurality of gears. The intermediate gears 40 transmit rotational driving forces from meshing gears to other meshing gears.

Specifically, the first intermediate gear 42 meshes with the drive gear 41, the first clutch 43, and the second intermediate gear 44. The first intermediate gear 42 transmits the rotational driving force from the drive gear 41 to the first clutch 43 and the second intermediate gear 44. That is, the first intermediate gear 42 rotates under the rotational driving force supplied by the drive gear 41 that meshes with the first intermediate gear 42. In addition, the first intermediate gear 42 rotates to supply the rotational driving force to the first clutch 43 and the second intermediate gear 44 that mesh with the first intermediate gear 42. The drive gear 41 is an example of a first gear of the present disclosure. A gear portion of the first clutch 43 meshing with the first intermediate gear 42 and the second intermediate gear 44 are examples of a second gear of the present disclosure.

Here, the first clutch 43 receives the rotational driving force from the first intermediate gear 42 through the gear portion that meshes with the first intermediate gear 42 and switches the operation between transmission and non-transmission of the rotational driving force to a clutch shaft 43A (see FIGS. 5 and 6). Specifically, the first clutch 43 switches between an ON state in which the first clutch 43 transmits the rotational driving force from the first intermediate gear 42 to the clutch shaft 43A and an OFF state in which the first clutch 43 interrupts the transmission of the rotational driving force to the clutch shaft 43A in response to a control signal input from a control portion (not shown).

A driven gear 43B shown in FIGS. 5 and 6 is secured to the clutch shaft 43A. The driven gear 43B meshes with an outside gear 55 (see FIGS. 3 and 6) disposed on an outer surface part of the second cover portion 62. The outside gear 55 meshes with an outside gear 56 (see FIG. 6) secured to the rotation shaft of the registration roller 23. That is, when in the ON state, the first clutch 43 supplies the rotational driving force of the drive motor 31 to the registration roller 23 to rotate the registration roller 23. In contrast, when in the OFF state, the first clutch 43 stops supplying the rotational driving force of the drive motor 31 to the registration roller 23.

The second intermediate gear 44 meshes with the first intermediate gear 42 and the third intermediate gear 45. The second intermediate gear 44 transmits the rotational driving force from the first intermediate gear 42 to the third intermediate gear 45.

The third intermediate gear 45 also meshes with a developing gear (not shown) connected to the developing roller 14A while meshing with the second intermediate gear 44. The third intermediate gear 45 is disposed such that part of the third intermediate gear 45 protrudes outward from the housing portion 33 through a window portion 33A (see FIG. 2) formed in the housing portion 33. The third intermediate gear 45 meshes with the developing gear at a position outside the window portion 33A. The third intermediate gear 45 transmits the rotational driving force from the second intermediate gear 44 to the developing gear. The rotation of the developing gear causes the developing roller 14A to rotate.

The fourth intermediate gear 46 meshes with the drive gear 41, the second clutch 47, the fifth intermediate gear 48, and the seventh intermediate gear 51. The fourth intermediate gear 46 transmits the rotational driving force from the drive gear 41 to the second clutch 47, the fifth intermediate gear 48, and the seventh intermediate gear 51.

Here, the second clutch 47 receives the rotational driving force from the fourth intermediate gear 46 through a gear portion that meshes with the fourth intermediate gear 46 and switches the operation between transmission and non-transmission of the rotational driving force to a clutch shaft 47A (see FIGS. 5 and 6). Specifically, the second clutch 47 switches between an ON state in which the second clutch 47 transmits the rotational driving force from the fourth intermediate gear 46 to the clutch shaft 47A and an OFF state in which the second clutch 47 interrupts the transmission of the rotational driving force to the clutch shaft 47A in response to the control signal input from the control portion.

The first sheet feed roller 21 is secured to the clutch shaft 47A. That is, when in the ON state, the second clutch 47 supplies the rotational driving force of the drive motor 31 to the first sheet feed roller 21 to rotate the first sheet feed roller 21. In contrast, when in the OFF state, the second clutch 47 stops supplying the rotational driving force of the drive motor 31 to the first sheet feed roller 21.

The fifth intermediate gear 48 meshes with the fourth intermediate gear 46 and the sixth intermediate gear 49. The fifth intermediate gear 48 transmits the rotational driving force from the fourth intermediate gear 46 to the sixth intermediate gear 49.

The sixth intermediate gear 49 meshes with the fifth intermediate gear 48 and the third clutch 50. The sixth intermediate gear 49 transmits the rotational driving force from the fifth intermediate gear 48 to the third clutch 50.

Here, the third clutch 50 receives the rotational driving force from the sixth intermediate gear 49 through a gear portion that meshes with the sixth intermediate gear 49 and switches the operation between transmission and non-transmission of the rotational driving force to a clutch shaft 50A (see FIGS. 5 and 6). Specifically, the third clutch 50 switches between an ON state in which the third clutch 50 transmits the rotational driving force from the sixth intermediate gear 49 to the clutch shaft 50A and an OFF state in which the third clutch 50 interrupts the transmission of the rotational driving force to the clutch shaft 50A in response to the control signal input from the control portion.

A driven gear 50B shown in FIGS. 5 and 6 is secured to the clutch shaft 50A. The driven gear 50B is connected to the second sheet feed roller 26 through a gear (not shown). That is, when in the ON state, the third clutch 50 supplies the rotational driving force of the drive motor 31 to the second sheet feed roller 26 to rotate the second sheet feed roller 26. In contrast, when in the OFF state, the third clutch 50 stops supplying the rotational driving force of the drive motor 31 to the second sheet feed roller 26.

The seventh intermediate gear 51 meshes with the fourth intermediate gear 46 and the eighth intermediate gear 52. The seventh intermediate gear 51 transmits the rotational driving force from the fourth intermediate gear 46 to the eighth intermediate gear 52.

The eighth intermediate gear 52 meshes with the seventh intermediate gear 51, the fourth clutch 53, and the fifth clutch 54. The eighth intermediate gear 52 transmits the rotational driving force from the seventh intermediate gear 51 to the fourth clutch 53 and the fifth clutch 54.

Here, the fourth clutch 53 receives the rotational driving force from the eighth intermediate gear 52 through a gear portion that meshes with the eighth intermediate gear 52 and switches the operation between transmission and non-transmission of the rotational driving force to a clutch shaft 53A (see FIGS. 5 and 6). Specifically, the fourth clutch 53 switches between an ON state in which the fourth clutch 53 transmits the rotational driving force from the eighth intermediate gear 52 to the clutch shaft 53A and an OFF state in which the fourth clutch 53 interrupts the transmission of the rotational driving force to the clutch shaft 53A in response to the control signal input from the control portion.

A driven gear 53B shown in FIGS. 5 and 6 is secured to the clutch shaft 53A. The driven gear 53B meshes with an outside gear 57 (see FIGS. 3 and 6) disposed on the outer surface part of the second cover portion 62. The outside gear 57 meshes with an outside gear 58 (see FIG. 6) secured to the rotation shaft of the first conveying roller 22. That is, when in the ON state, the fourth clutch 53 supplies the rotational driving force of the drive motor 31 to the first conveying roller 22 to rotate the first conveying roller 22. In contrast, when in the OFF state, the fourth clutch 53 stops supplying the rotational driving force of the drive motor 31 to the first conveying roller 22.

The fifth clutch 54 receives the rotational driving force from the eighth intermediate gear 52 through a gear portion that meshes with the eighth intermediate gear 52 and switches the operation between transmission and non-transmission of the rotational driving force to a clutch shaft 54A (see FIGS. 5 and 6). Specifically, the fifth clutch 54 switches between an ON state in which the fifth clutch 54 transmits the rotational driving force from the eighth intermediate gear 52 to the clutch shaft 54A and an OFF state in which the fifth clutch 54 interrupts the transmission of the rotational driving force to the clutch shaft 54A in response to the control signal input from the control portion.

A driven gear 54B shown in FIGS. 5 and 6 is secured to the clutch shaft 54A. The driven gear 54B meshes with an outside gear 59 (see FIGS. 3 and 6) disposed on the outer surface part of the second cover portion 62. The outside gear 59 meshes with an outside gear 60 (see FIG. 6) secured to the rotation shaft of the duplex roller 27. That is, when in the ON state, the fifth clutch 54 supplies the rotational driving force of the drive motor 31 to the duplex roller 27 to rotate the duplex roller 27. In contrast, when in the OFF state, the fifth clutch 54 stops supplying the rotational driving force of the drive motor 31 to the duplex roller 27.

There is known a drive transmission device that aims to prevent transmission of driving noise generated by the gear train 32 by covering one side of the gear train 32 with a resin cover portion. However, the drive transmission device cannot prevent the transmission of the driving noise generated by the gear train 32 to the outside of the cover portion because the cover portion covers only one side of the gear train 32.

In contrast, the image forming apparatus 200 according to the embodiment of the present disclosure can prevent the transmission of the driving noise to the outside as described below.

The housing portion 33 forms a storage space that houses the gear train 32. Specifically, as shown in FIGS. 2 and 3, the housing portion 33 has a box shape, that is, is a substantially rectangular parallelepiped that is small in thickness in the left-right direction D3. The housing portion 33 is formed from a synthetic resin material such as PC/ABS.

As shown in FIG. 4, the housing portion 33 includes the first cover portion 61 and the second cover portion 62. The first cover portion 61 constitutes a right part of the substantially rectangular parallelepiped housing portion 33. The second cover portion 62 constitutes a left part of the substantially rectangular parallelepiped housing portion 33. The first cover portion 61 and the second cover portion 62 cover both sides of the gear train 32. The first cover portion 61 and the second cover portion 62 are an example of a pair of cover portions of the present disclosure.

As shown in FIG. 7, the first cover portion 61 includes a panel portion 61A and wall portions 61B. The panel portion 61A has a flat, substantially rectangular shape orthogonal to the left-right direction D3 and faces the right side of the gear train 32 (see FIG. 4). The wall portion 61B protrudes from the panel portion 61A to the gear train 32. The wall portions 61B extend along the edge of the panel portion 61A except for a position P1 (see FIG. 7) where the window portion 33A (see FIG. 2) is formed and a position where a third internal thread portion 106 (see FIG. 7) is formed.

As shown in FIG. 9, the second cover portion 62 includes a panel portion 62A and a wall portion 62B. The panel portion 62A has a flat, substantially rectangular shape orthogonal to the left-right direction D3 and faces the left side of the gear train 32 (see FIG. 4). The wall portion 62B protrudes from the panel portion 62A to the gear train 32. The wall portion 62B extends along the edge of the panel portion 62A.

As shown in FIG. 9, the wall portion 62B of the second cover portion 62 is provided with a plurality of engaging portions 62C. Each of the engaging portions 62C includes a beam portion extending from the wall portion 62B to the right and a hook portion protruding outward from the extended end of the beam portion to the outside of the panel portion 62A. In addition, as shown in FIG. 7, the wall portions 61B of the first cover portion 61 are provided with a plurality of engagement portions 61C to be engaged. The engagement portions 61C are recessed portions or openings formed in the wall portions 61B. The engaging portions 62C of the second cover portion 62 engage with the respective engagement portions 61C of the first cover portion 61 by snap-fit. This joints the first cover portion 61 and the second cover portion 62, and thereby the panel portion 61A, the wall portions 61B, the panel portion 62A, and the wall portion 62B form the storage space that houses the gear train 32 and the window portion 33A (see FIG. 2).

As shown in FIG. 7, the panel portion 61A of the first cover portion 61 is provided with an opening 71, a first hole portion 72, a first clutch housing portion 73, a second hole portion 74, a third hole portion 75, a fourth hole portion 76, a second clutch housing portion 77, a fifth hole portion 78, a sixth hole portion 79, a third clutch housing portion 80, a seventh hole portion 81, an eighth hole portion 82, a fourth clutch housing portion 83, and a fifth clutch housing portion 84.

The drive shaft 31A of the drive motor 31 is placed through the opening 71. The rotation shaft 92 (see FIG. 6) of the first intermediate gear 42 is placed through the first hole portion 72. The first clutch housing portion 73 is a recessed portion hollowed to the right and houses the first clutch 43. The rotation shaft 93 (see FIG. 6) of the second intermediate gear 44 is placed through the second hole portion 74. The rotation shaft 94 (see FIG. 6) of the third intermediate gear 45 is placed through the third hole portion 75. The rotation shaft 95 (see FIG. 6) of the fourth intermediate gear 46 is placed through the fourth hole portion 76. The second clutch housing portion 77 is a recessed portion hollowed to the right and houses the second clutch 47.

The rotation shaft 96 (see FIG. 6) of the fifth intermediate gear 48 is placed through the fifth hole portion 78. The rotation shaft 97 (see FIG. 6) of the sixth intermediate gear 49 is placed through the sixth hole portion 79. The third clutch housing portion 80 is a recessed portion hollowed to the right and houses the third clutch 50. The rotation shaft 98 (see FIG. 6) of the seventh intermediate gear 51 is placed through the seventh hole portion 81. The rotation shaft 99 (see FIG. 6) of the eighth intermediate gear 52 is placed through the eighth hole portion 82. The fourth clutch housing portion 83 is a recessed portion hollowed to the right and houses the fourth clutch 53. The fifth clutch housing portion 84 is a recessed portion hollowed to the right and houses the fifth clutch 54.

As shown in FIG. 9, the panel portion 62A of the second cover portion 62 is provided with a first bearing portion 111, a second bearing portion 112, a first gear housing portion 113, a third bearing portion 114, a fourth bearing portion 115, a fifth bearing portion 116, a sixth bearing portion 117, a seventh bearing portion 118, an eighth bearing portion 119, a second gear housing portion 120, a ninth bearing portion 121, a tenth bearing portion 122, a third gear housing portion 123, and a fourth gear housing portion 124.

The first bearing portion 111 rotatably supports the drive shaft 31A of the drive motor 31. The second bearing portion 112 supports the left end of the rotation shaft 92 (see FIG. 6) of the first intermediate gear 42. The first gear housing portion 113 is a recessed portion hollowed to the left and houses the driven gear 43B (see FIG. 5) of the first clutch 43 while rotatably supporting the clutch shaft 43A. The third bearing portion 114 supports the left end of the rotation shaft 93 (see FIG. 6) of the second intermediate gear 44. The fourth bearing portion 115 supports the left end of the rotation shaft 94 (see FIG. 6) of the third intermediate gear 45. The fifth bearing portion 116 supports the left end of the rotation shaft 95 (see FIG. 6) of the fourth intermediate gear 46. The sixth bearing portion 117 rotatably supports the clutch shaft 47A (see FIG. 5) of the second clutch 47.

The seventh bearing portion 118 supports the left end of the rotation shaft 96 (see FIG. 6) of the fifth intermediate gear 48. The eighth bearing portion 119 supports the left end of the rotation shaft 97 (see FIG. 6) of the sixth intermediate gear 49. The second gear housing portion 120 is a recessed portion hollowed to the left and houses the driven gear 50B (see FIG. 5) of the third clutch 50 while rotatably supporting the clutch shaft 50A. The ninth bearing portion 121 supports the left end of the rotation shaft 98 (see FIG. 6) of the seventh intermediate gear 51. The tenth bearing portion 122 supports the left end of the rotation shaft 99 (see FIG. 6) of the eighth intermediate gear 52. The third gear housing portion 123 is a recessed portion hollowed to the left and houses the driven gear 53B (see FIG. 5) of the fourth clutch 53 while rotatably supporting the clutch shaft 53A. The fourth gear housing portion 124 is a recessed portion hollowed to the left and houses the driven gear 54B (see FIG. 5) of the fifth clutch 54 while rotatably supporting the clutch shaft 54A.

The support portion 34 supports the rotation shafts 90 (see FIG. 6) of the intermediate gears 40 at a position outside the housing portion 33. As shown in FIGS. 4 and 8, the support portion 34 has a flat plate shape. The support portion 34 is composed of a metal plate member.

The support portion 34 supports the plurality of rotation shafts 90 respectively corresponding to the plurality of intermediate gears 40. Specifically, as shown in FIG. 8, the support portion 34 supports the rotation shaft 92 of the first intermediate gear 42, the rotation shaft 93 of the second intermediate gear 44, the rotation shaft 94 of the third intermediate gear 45, the rotation shaft 95 of the fourth intermediate gear 46, the rotation shaft 96 of the fifth intermediate gear 48, the rotation shaft 97 of the sixth intermediate gear 49, the rotation shaft 98 of the seventh intermediate gear 51, and the rotation shaft 99 of the eighth intermediate gear 52. The rotation shafts 90 are formed from metal materials.

For example, the rotation shafts 90 are secured to the left face of the support portion 34 by plastic deformation. In the image forming apparatus 200, the plurality of the rotation shafts 90 are supported by the flat-shaped support portion 34. This can improve the accuracy in positioning the rotation shafts 90 compared with a configuration in which the support portion 34 includes stepped portions formed by bending. It is noted that the rotation shafts 90 may be secured to the support portion 34 by screwing, welding, or the like.

As illustrated in FIGS. 4 and 8, the drive motor 31 is secured to the right face of the support portion 34. As shown in FIG. 8, the drive motor 31 is screwed to the support portion 34. The support portion 34 has an opening 91 through which the drive shaft 31A of the drive motor 31 is placed.

The support portion 34 is secured to the outer surface of the first cover portion 61. The outer surface of the first cover portion 61 is a surface of the panel portion 61A of the first cover portion 61 on a side opposite to that facing the second cover portion 62. Specifically, as shown in FIGS. 2, 4, and 8, the support portion 34 includes a first screw hole portion 101, a second screw hole portion 102, and a third screw hole portion 103 through which screws of a predetermined size can be placed. In addition, as shown in FIG. 7, the first cover portion 61 includes a first internal thread portion 104, a second internal thread portion 105 and the third internal thread portion 106. The above-described screws are used to secure the support portion 34 to the outer surface of the first cover portion 61.

In the description below, the first internal thread portion 104, the second internal thread portion 105, and the third internal thread portion 106 are also collectively referred to as "internal thread portions 100".

The internal thread portions 100 have internal threads corresponding to the above-described screws. The internal thread portions 100 protrude from the panel portion 61A of the first cover portion 61 to the second cover portion 62. As shown in FIG. 7, the internal thread portions 100 each have a cylindrical shape. The first internal thread portion 104 is disposed at a position away from the wall portions 61B. The second internal thread portion 105 is partially in contact with one of the wall portions 61B. The third internal thread portion 106 is disposed on the edge of the panel portion 61A and held between the wall portions 61B.

The screw placed through the first screw hole portion 101 is screwed into the first internal thread portion 104. The screw placed through the second screw hole portion 102 is screwed into the second internal thread portion 105. The screw placed through the third screw hole portion 103 is screwed into the third internal thread portion 106. This secures the support portion 34 to the outer surface of the first cover portion 61. In the image forming apparatus 200, the support portion 34 is secured to the housing portion 33. This facilitates the attachment and detachment of the driving force supply portion 28 to and from the body frame of the image forming apparatus 200 compared with a configuration in which the support portion 34 and the housing portion 33 are separately secured to the body frame. It is noted that the support portion 34 does not necessarily need to be secured to the housing portion 33.

In the image forming apparatus 200, lubricant is applied to contact areas of the intermediate gears 40 and the rotation shafts 90 for smooth rotation of the intermediate gears 40. For example, the lubricant contains polyalphaolefin as a main ingredient.

Here, while the gear train 32 is driven, lubricant may scatter and adhere to the inner surface of the resin housing portion 33. This may cause deterioration of the spots to which the lubricant adheres. Specifically, the internal thread portions 100, which are subjected to stress from screwing, easily deteriorate by the lubricant adhering thereto.

Accordingly, in the image forming apparatus 200, the second cover portion 62 is provided with partition portions 130 (see FIG. 9).

The partition portions 130 protrude from the second cover portion 62 to the first cover portion 61. The partition portions 130 separate the internal thread portions 100 from the storage space for the gear train 32 in the housing portion 33.

Specifically, as shown in FIG. 9, the second cover portion 62 is provided with a first partition portion 131 at a position facing the first internal thread portion 104. The first partition portion 131 protrudes to be brought into contact with the panel portion 61A of the first cover portion 61. The first partition portion 131 has a tubular shape that can house the first internal thread portion 104. Thus, the part of the first internal thread portion 104 protruding from the panel portion 61A is covered by the first partition portion 131. This prevents the adhesion of the lubricant to the first internal thread portion 104.

In addition, as shown in FIG. 9, the second cover portion 62 is provided with a second partition portion 132 at a position facing the second internal thread portion 105. The second partition portion 132 protrudes to be brought into contact with the panel portion 61A of the first cover portion 61. The second partition portion 132 faces one of the wall portions 61B of the first cover portion 61 with the second internal thread portion 105 therebetween. This forms a storage space for the second internal thread portion 105 located between the second partition portion 132 and the wall portion 61B and separated from the storage space for the gear train 32. Thus, the part of the second internal thread portion 105 protruding from the panel portion 61A is covered by the second partition portion 132 and the wall portion 61B. This prevents the adhesion of the lubricant to the second internal thread portion 105.

In addition, as shown in FIG. 9, the second cover portion 62 is provided with a third partition portion 133 at a position facing the third internal thread portion 106. The third partition portion 133 protrudes to be brought into contact with the panel portion 61A of the first cover portion 61. The third partition portion 133 and the wall portions 61B on both sides of the third internal thread portion 106 form a partition that separates the third internal thread portion 106 from the storage space for the gear train 32. This prevents the adhesion of the lubricant to the third internal thread portion 106.

It is noted that the second cover portion 62 does not necessarily need to include the partition portions 130.

In this manner, in the driving force supply portion 28, the first cover portion 61 and the second cover portion 62 formed from resin cover both sides of the gear train 32. This prevents the transmission of the driving noise generated by the gear train 32 to the outside compared with the configuration in which only one side of the gear train 32 is covered by the resin cover portion.

It is noted that the number of intermediate gears 40 included in the gear train 32 may be any number including one.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A drive transmission device comprising:
a plurality of intermediate gears meshing with a first gear and a second gear to transmit a rotational driving force from the first gear to the second gear;
a housing portion formed from resin and including a pair of cover portions to house a gear train including the plurality of intermediate gears, the cover portions covering both sides of the gear train; and
a support portion formed from metal and supporting a plurality of rotation shafts of the plurality of intermediate gears at a position outside the housing portion, wherein
the support portion has a flat plate shape and supports the plurality of rotation shafts respectively corresponding to the plurality of intermediate gears.

2. The drive transmission device according to claim 1, wherein
the support portion is secured to an outer surface of a first cover portion of the pair of cover portions.

3. The drive transmission device according to claim 2, wherein
lubricant is applied to contact areas of the plurality of intermediate gears and the plurality of rotation shafts,
the first cover portion includes an internal thread portion protruding to a second cover portion of the pair of cover portions and having an internal thread corresponding to a screw used to secure the support portion to the first cover portion, and
the second cover portion includes a partition portion protruding to the first cover portion and separating the internal thread portion from a storage space for the gear train in the housing portion.

4. An image forming apparatus comprising:
a driving source;
a load driven by a driving force supplied by the driving source; and
the drive transmission device according to claim 1 used to transmit the driving force from the driving source to the load.

5. A drive transmission device comprising:
an intermediate gear meshing with a first gear and a second gear to transmit a rotational driving force from the first gear to the second gear;
a housing portion formed from resin and including a pair of cover portions to house a gear train including the intermediate gear, the cover portions covering both sides of the gear train; and
a support portion formed from metal and supporting a rotation shaft of the intermediate gear at a position outside the housing portion, wherein
the support portion is secured to an outer surface of a first cover portion of the pair of cover portions,
lubricant is applied to a contact area of the intermediate gear and the rotation shaft,
the first cover portion includes an internal thread portion protruding to a second cover portion of the pair of cover portions and having an internal thread corresponding to a screw used to secure the support portion to the first cover portion, and
the second cover portion includes a partition portion protruding to the first cover portion and separating the internal thread portion from a storage space for the gear train in the housing portion.

6. An image forming apparatus comprising:
a driving source;
a load driven by a driving force supplied by the driving source; and
the drive transmission device according to claim 5 used to transmit the driving force from the driving source to the load.

* * * * *